April 9, 1963 M. STAUNT 3,084,439
AIR DRIVEN DENTAL HANDPIECES
Filed Jan. 28, 1959 9 Sheets-Sheet 1

April 9, 1963 M. STAUNT 3,084,439
AIR DRIVEN DENTAL HANDPIECES
Filed Jan. 28, 1959 9 Sheets-Sheet 6

INVENTOR.
Martin Staunt,
BY Robert H. Wendt
Attorney.

April 9, 1963 M. STAUNT 3,084,439
AIR DRIVEN DENTAL HANDPIECES
Filed Jan. 28, 1959 9 Sheets-Sheet 7

INVENTOR.
Martin Staunt,
BY Robert H. Wendt.
Attorney.

April 9, 1963

M. STAUNT 3,084,439

AIR DRIVEN DENTAL HANDPIECES

Filed Jan. 28, 1959

INVENTOR.
Martin Staunt,
BY Robert H. Wendt
Attorney.

United States Patent Office 3,084,439
Patented Apr. 9, 1963

3,084,439
AIR DRIVEN DENTAL HANDPIECES
Martin Staunt, 4439 W. Rice St., Des Plaines, Ill.
Filed Jan. 28, 1959, Ser. No. 789,751
3 Claims. (Cl. 32—27)

The present invention relates to air driven dental handpieces, and is particularly concerned with the provision of an improved contra angle handpiece adapted to be driven by air for the purpose of drilling, milling, grinding, or treating restorative cavities in carious teeth to prepare them for fillings, crowns, bridges, inlays, or other restorative measures.

I desire it to be understood that the air driven turbine, which forms the power source of my contra angle handpiece, is of general application and may be used for various purposes in the arts; and the handpiece itself may be employed for grinding, milling, engraving, polishing, die sinking, and many other operations of a similar nature.

The present application is a continuation-in-part of my prior applications Ser. No. 494,607, filed March 16, 1955, now abandoned, for Dental Handpieces, Ser. No. 620,434 filed November 5, 1956, now Patent No. 2,988,815, for Dental Handpieces, Ser. No. 633,067 filed January 8, 1957, for Self-Lubricating and Self-Cleaning Dental Handpieces, Ser. No. 633,068 filed January 8, 1957, for Contra Angles for Dental Handpieces, which issued November 10, 1959, U.S. Patent No. 2,911,721, Ser. No. 633,069 filed January 8, 1957, for Dental Handpieces, U.S. Patent No. 2,923,060, issued February 2, 1960.

One of the primary objects of the invention is the provision of an improved device of the class described which operates at a high speed, such as thousands of revolutions per minute, for the purpose of expediting the grinding operations, but with a minimum amount of noise and vibration, since the reduction of vibration and the reduction of the noise level is of the greatest importance to both the patient and the operator in the employment of such a tool for dental operations.

Another object of the invention is the provision of an improved air driven turbine which produces a maximum torque at the driving spindle with the use of a minimum amount of air, and which operates at high rotary speeds, such as between 100,000 r.p.m. to 200,000 r.p.m. and over smoothly and with a minimum vibration and more quiet operation than any of the devices of the prior art.

Another object of the invention is the provision of an improved dental handpiece assembly which is adapted to be used with tungsten carbide or diamond burs at high speeds to produce effective cutting in a minimum time and to reduce the heat at the cutting surface and in the bearings of a handpiece to a comfortable level for the purpose of providing less trauma and greater comfort to the patient and lessening the strain and tension of the operator.

Another object of the invention is the provision of an improved air driven dental handpiece in which the air is employed not only for driving the air turbine, but for cooling the parts of the mechanism and for lubricating the bearings and cooling the bur, at which point the cooling of the air is supplemented by a combined air and water spray directed toward the bur and into the cavity, the control of the cooling medium being automatic and simultaneously applied with the operation of the handpiece.

Another object of the invention is the provision of an improved construction of an air driven dental handpiece which is adapted to be lubricated effectively at speeds over 200,000 r.p.m. and so constructed that dirt and grindings are excluded and driven out of the housing containing the ball bearings and other moving parts by employing a combined air and lubricant mist, with a minimum amount of the lubricant reaching the interior of the mouth, where it might be breathed, and practically all of the exhaust air being carried back through suitable conduits to a point away from the patient and the operator.

Another object of the invention is the provision of an improved air driven dental handpiece in which the air path through the turbine is reduced in length to a minimum and graduated in size, increasing in volume as it progresses, and smoothly directed with minimum turbulence to an enlarged outlet for the purpose of reducing the sound level, increasing the torque, and reducing the volume and pressure of air required.

Another object of the invention is the provision of an improved air driven handpiece contra angle so constructed that it is adapted to be used with a supply of air under pressure and a supply of water under pressure, both of which are controlled by the foot of the operator so that a dental bur cutting at a high speed is automatically cooled by a jet of water combined with atomizing air directed toward the point of grinding, and the grinding may be stopped without removing the handpiece from the mouth, and air at room temperature or elevated temperature momentarily directed into the cavity to blow out the chips and grindings and dry the cavity while it is still being inspected, after which the grinding may continue, if necessary, and brought to completion with repeated periods of grinding and clean-out, without ever removing the handpiece from the mouth of the patient to reach for the hot air syringe, as is done with devices of the prior art.

Other objects and advantages of the invention will be apparent from the following description and the accompanying drawings, in which similar characters indicate similar parts throughout the several views.

Referring to the drawings, in which there are nine sheets.

Figures 1, 2, 3, 4, 5:
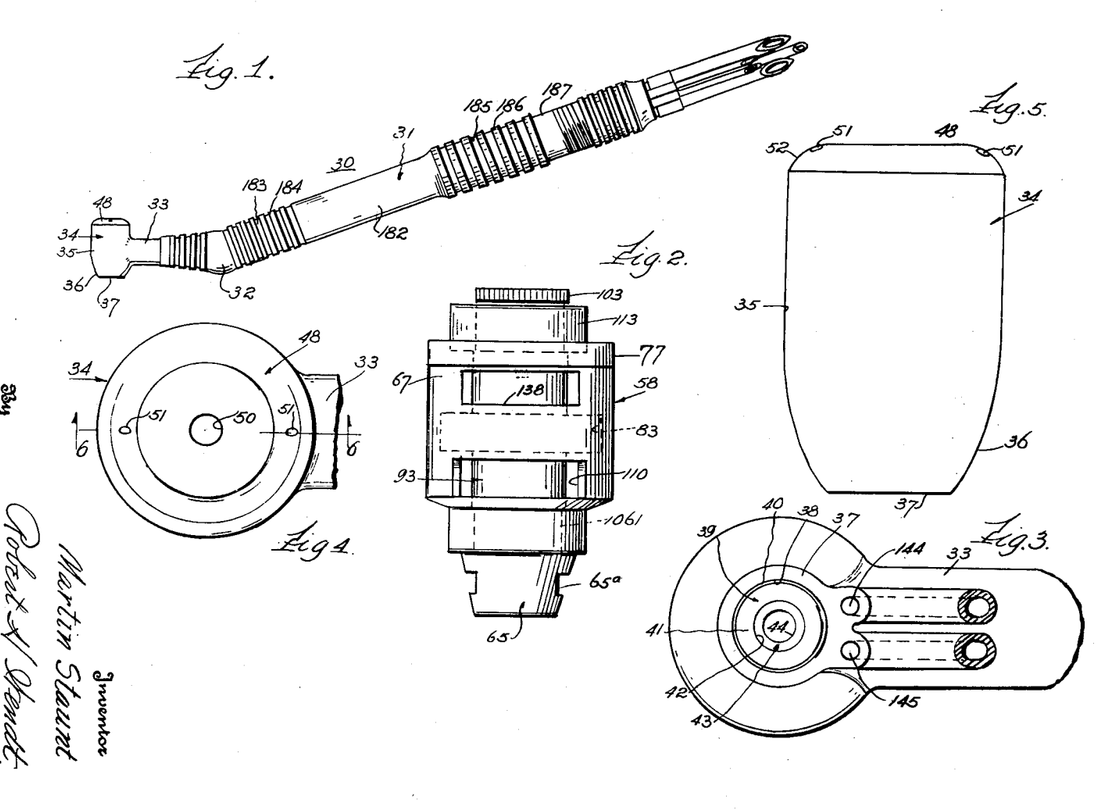
FIG. 1 is a fragmentary side elevational view of an air driven contra angle handpiece, full size, embodying the invention.
FIG. 2 is an enlarged side elevational view of the removable turbine unit.
FIG. 3 is an enlarged fragmentary bottom plan view of the head of the handpiece on a scale of six to one.
FIG. 4 is ragmentary top plan view of the handpiece head.
FIG. 5 is a similar end elevational view of the handpiece head.

Referring to FIGS. 1–6, the air driven handpiece 30 embodying the invention is shown full size in FIG. 1.

It preferably comprises a handle tube 31 carrying an elbow fitting 32 at its lower end, which supports the neck tube 33 at an obtuse angle to the handle 31; and the neck tube 33 carries a handpiece head 34, comprising a housing member made of brass, nickel-chrome plated (FIG. 1); and the head 34 may be substantially cylindrically shaped, having a cylindrical wall 35, which is rounded and tapered at its lower portion 36 to remove as much as possible of that portion of the housing which might obscure the view of the end of a dental bur mounted in the head 34.

The lower end of the head 34 has a generally plane surface 37, which is provided with a central circular aperture 38 that is slightly spaced from the circular end 39 of a rotating bur shaft, leaving an annular clearance 40 serving as an annular air escape and air spray nozzle for air issuing from the housing of the handpiece.

It is this escaping air which is so restricted at the annular nozzle 40 that it maintains an air pressure inside the handpiece housing and excludes the ingress of dirt and grindings by the outward flow of air from the handpiece housing under operation.

Figures 6, 7:
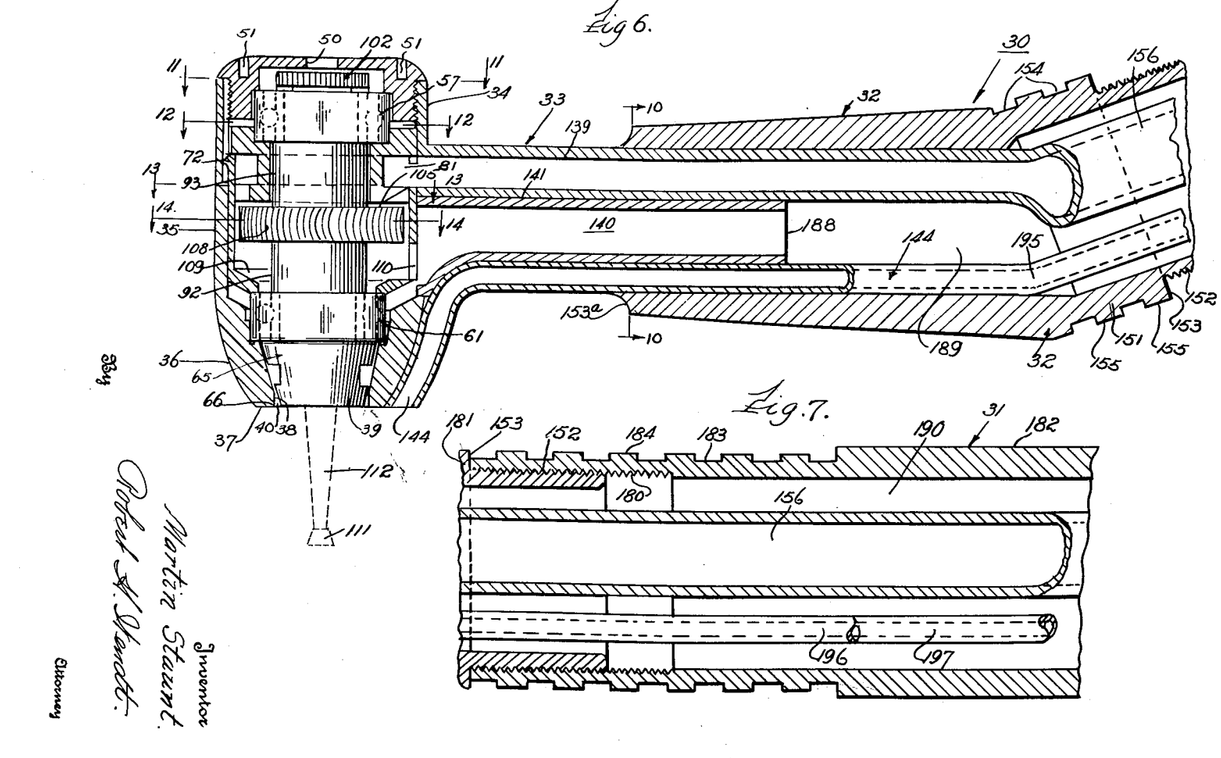
FIG. 6 is a fragmentary sectional view of the handpiece head and its supporting neck and elbow, taken on the plane of the line 6—6 of FIG. 4, looking in the direction of the arrows.
FIG. 7 is a fragmentary sectional view showing a continuation extending from the right end of FIG. 6, being the lower end of the handle of the handpiece.
Figure 8:
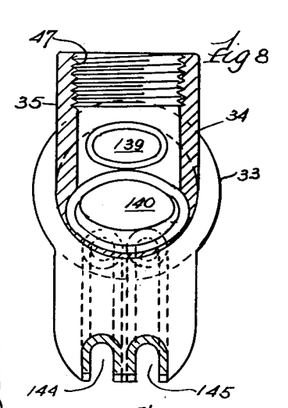
FIG. 8 is a fragmentary sectional view, taken on the plane of the line 8—8 of FIG. 6, looking in the direction of the arrows, and showing the ends of the inlet and outlet conduits in the neck of the handpiece.
Figure 9:
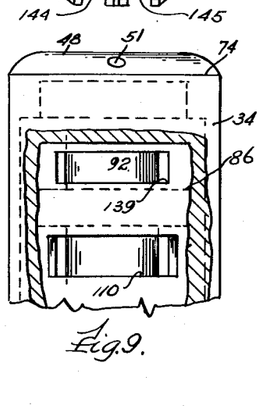
FIG. 9 is a fragmentary sectional view, showing the shape of the inlet and outlet conduits in the spacer shell of the turbine unit, also shown in FIG. 2.

The end of the bur shaft or spindle 39 is shown at 41; and the bur shaft has a cylindrical bore 42 which contains a plastic bur tube 43, having a cylindrical bore 44 for frictionally gripping the cylindrical portion of the shank of a bur or other tool to be driven by the handpiece, as shown in FIG. 6. The cap 48 is preferably of stainless steel.

The head 34 is open at its upper end, being provided with a cylindrical bore 45 (FIG. 18) having an internally threaded counterbore 46 at its upper end for receiving the externally threaded portion 47 of a top cap 48, which closes the upper end 74 of the housing, except for the central aperture 50 in the cap that is used for inserting a tool employed in pushing out the shank of a dental bur when it is to be removed.

The cap 48 has a pair of diametrically opposite circular sockets 51 for receiving the lugs of a spanner wrench used in tightening the cap. The cap is rounded at its outer edge portion 52 and may be threaded so far into the head 34 that its edge merges with the top of the head, forming a smoothly rounded upper corner without projections that might injure the mouth.

At its lower side the cap 48 has the plug formation 53, which is provided with a bore 54, large enough to receive the upper outer race of the ball bearing assembly, and the plug is formed with a smaller counterbore 55 for receiving the upper end of the spindle and its associated parts, with a clearance so that the spindle may rotate without contacting the cover.

The plug formation 53 has an annular shoulder 56 for engaging the outer race of the upper ball bearing assembly 57 to secure the removable turbine unit 58 in the head 34.

The head 34 has a frusto-conical inner surface 59 toward its lower end and a reduced counterbore 60 for receiving the outer race of the lower ball bearing assembly 61 against an annular shoulder 62. From the annular shoulder 62 the interior of the head 34 has a frusto-conical inner surface 63, providing a clearance with respect to an external frusto-conical surface 64 on an enlargement 65 of the bur shaft 39, thereby forming the annular nozzle clearance 40, which is slightly enlarged at its lower end by forming a flaring crack 66 of annular shape.

This annular crack or nozzle permits air to escape from the interior of the head housing 34, but maintains sufficient resistance to its escape to provide a pressure inside the housing, to exclude dirt and grindings from the housing.

The air turbine constitutes a removable unit 58 because all of its parts are carried by a cylindrical stainless steel shell 67. This shell 67 has an outer cylindrical surface 68 and an inner cylindrical bore 69.

At its lower end it has an inwardly extending frusto-conical flange 70, terminating in an annular end surface 71 that engages the outer race of the lower ball bearing assembly 61 to secure it in the head 34.

The shell 67 fits in the bore 45 of the head 34 and is secured against rotation therein by an outwardly turned tab or lug 72 pressed out of its upper edge to extend into a rectangular groove 73, which extends upwardly across the threads 46, and is open at the top end 74 so that the turbine unit may be slid downward into the bore 45 when the lug 72 registers with the groove 73; but thereafter it cannot rotate.

The upper end of the shell 67 is indicated at 75, presenting an annular surface which engages the lower surface 76 of the upper enlargement 77 of the stator 78. The stator 78 comprises a cylindrical body or enlargement 77 integrally joined to a central tubular portion 79 and a lower cylindrical body 80, which forms a floor or lower wall of an annular rectangular groove 81, serving as a stator air manifold.

The tubular portion 79 of the stator 78 has a central through bore 82, clearing the parts of the rotor 83; and there is a cylindrical counterbore 84 in the top of the stator, terminating at an annular shoulder 85 engaging the lower edge of the outer race of the upper ball bearing assembly 57, which is located in the counterbore 84.

The stator enlargement 77 closes the upper end of the stator manifold 81 by engaging the shell 67; and the lower floor 80 of the stator engages in the shell bore 69 with its outer cylindrical surface 86 and closes the lower side of the air manifold 81, except that the floor 80 of the stator has a multiplicity of nozzle slots 87, which form nozzle apertures in combination with the inner surface 69 of the shell 67.

The slots 87 in the stator floor are at an acute angle to the upper and lower stator surfaces 88, 89 so that the air issuing from the surface 89 of the stator may have an axial component to move the air out of the stator and into the rotor; but the major component is in a peripheral direction and in the direction of rotation of the rotor.

The angularity may vary; and I have found that an angle of 60 degrees to the axis of the turbine produces a driving torque which is stronger than the devices of the prior art and that performance is improved at an angle of 65 degrees.

The slots 87 in the stator are made by means of a milling cutter; and while a suitable torque has been produced by using slots fifteen thousandths of an inch in width, I prefer to employ slots ten thousandths of an inch in width, this being the width of the milling cutter, for the reason that this reduces air consumption and still provides excellent torque.

This results in slots which are parallel walled and substantially rectangular and complementary in shape to the cutter. A multiplicity of such slots is provided, such as eight slots in the stator of this size, with thirty-two slots in the rotor. This also reduces the possibility of the existence of a dead center, as each air nozzle is directed toward four slots in the rotor.

The rotor 83 comprises a substantially cylindrical metal body preferably made of brass, like the stator and shell; and the body 90 is integrally joined to a pair of tubular extensions 91, 92 having cylindrical outer surfaces 93 and a cylindrical bore 94.

The cylindrical bore 94 is adapted to receive the tubular body 95 of a bur shaft 39, preferably of stainless steel, which has the frusto-conical enlargement 65 at its lower end. The cylindrical part 95 of the bur shaft may support the inner race 96 of the ball bearing assembly 61 against the annular shoulder 97; and this race is in turn engaged by the end surface 98 of the tube 92. The races and balls are preferably made of stainless steel.

The tube 92 and the rotor 83 and upper tube 93 are mounted on the bur tube; and the upper end 99 of the rotor tube 93 engages the bottom of the upper ball bearing race 100. The bur tube 93 is provided at its upper end with inner threads 101 and with a screw plug 102 threaded into the threaded bore. The screw plug has a laterally extending or radial flange 103, the bottom of which may engage a metal washer 104, which engages the upper race 100. Thus the inner races and the rotor are secured on the bur shaft, on which they may also have a close fit. The threads on the screw plug 102 are left hand to prevent the plug from being loosened by right hand rotation of the bur shaft 39.

The cylindrical rotor body 90 has an upper plane surface 105 and a lower plane surface 106, which are spaced farther from each than the thickness of the stator floor.

The rotor body 93 has a cylindrical outer surface 107, which has a close clearance with respect to the inner surface 69 of the shell, but permits the rotor to rotate freely without contact. The rotor is preferably provided with four times as many slots in its periphery as there are slots in the stator; and the rotor slots are cut by means of a tubular milling cutter, which has a sufficiently large diameter and is used on a rotor of smaller diameter so that one edge of the tubular cutter may cut a curved slot like that indicated at 108 in the rotor 83, there being 32 such slots, for example, in a rotor which produces a high torque.

The curvature of the slots 108 relative to the upper and lower surfaces of the rotor depends on the location of the tubular cutter, which in FIG. 6 had its axis located midway between the upper and lower surfaces of the rotor. This makes the curvature a circular arc symmetrically located across the rotor.

By employing stator jets only one-fourth in number to the number of the rotor slots a more smooth rotating torque is impressed on the rotor; and by employing the specific construction shown, the air passing through the stator and rotor takes the shortest possible path, with a minimum amount of turbulence and a maximum amount of torque.

The air is discharged into a lower expansion chamber 109, from which the air is exhausted out of the turbine at a lateral exhaust port 110. The air is also used to pass through the lower ball bearing assembly 61 at the spaces between the balls; and the air issues through the conical slot 66 and is discharged in a conical spray toward the cutting end 111 of the bur 112 due to the flare 66, which exists at the lower end of the slot 40.

The clearance between the upper surface 105 on the rotor and the lower surface of the stator floor is quite close, in the nature of seven thousandths of an inch; but the rotor and its bearing parts have a limited axial freedom due to a certain looseness of the balls in the ball bearing races.

The structure of the ball bearings employed in the turbine is of the utmost importance and they are preferably constructed substantially as shown in my prior application, Ser. No. 752,447, now Patent No. 2,911,268, on Ball Bearing Assemblies and Methods of Making Them, filed August 1, 1958; and the disclosure of that application is hereby incorporated herein by reference thereto.

Each of the ball bearing asemblies 57 and 61 includes the following parts. The bearing assembly 57 includes the inner race 100, outer race 113, balls 114, and ball retainer 115. The races and balls are preferably made of hardened stainless steel, but carbon steel balls may also be used.

The outer race 113 has cylindrical outer surface 113a and an inner cylindrical surface. The inner race 100 has the inner cylindrical surface 117 and an outer cylindrical surface. The ends or edges of both races are plane; but the corners are preferably chamfered.

The outer race 113 has a ball groove 119 of partially circular cross section on its inside formed on a radius larger that the radius of the ball 114; and the inner race 100 has an outer groove 120 registering with the groove 119 and formed on a radius which is larger than the radius of the balls 114.

The ball grooves 119 and 120 are uniform in cross section and extend all the way around the inside and outside, respectively, of the outer and inner races; and there are no filling grooves.

The grooves are not filled with a full complement of balls 114, but only include a lesser number, so few that when all the balls are arranged on one side, there is a sufficient crack between the inner race and the outer race to insert or remove balls edgewise into a out of the crack until they reach the groove.

For example, the present bearings include seven balls, which are equally spaced in the grooves by the ball retainer 115. The ball retainer comprises a plastic member of lubricating characteristics, such as nylon or some polyethylene compound; and the ball retainer is made out of a short length of nylon tubing, which forms a closed annulus of such size that it may be received between the inner race and the outer race with a clearance with respect to both of them.

The retainer 115 has seven ball sockets 121, comprising circular bores, the diameter of which may be 0.043 when balls are employed having a diameter of 0.0394". The inner diameter of the inner race 100 may be 0.0125" or 0.0135", depending on the shaft diameter.

The outer diameter of the outer race may be ¼". The length of the races may be ³⁵/₃₂"; and the ball retainer may be 0.081 in width.

The ball retainer 115 is provided for each ball bore 121 with a longitudinally extending slot 122; and this slot is of smaller size than the diameter of the balls. For balls having a diameter of 0.0394" the slots may be 0.035", or ⁴/₁₀₀₀ narrower than the balls.

The permits the balls to be pressed into the slots or the slots to be pressed over the balls by exerting a predetermined force. The balls snap into the bores 121, where they are retained by the restricted slots.

The dimensions given in this specification are merely by way of example, and may be varied in devices of different sizes.

Figures 10, 11, 12, 13, 14, 15, 16, 17:
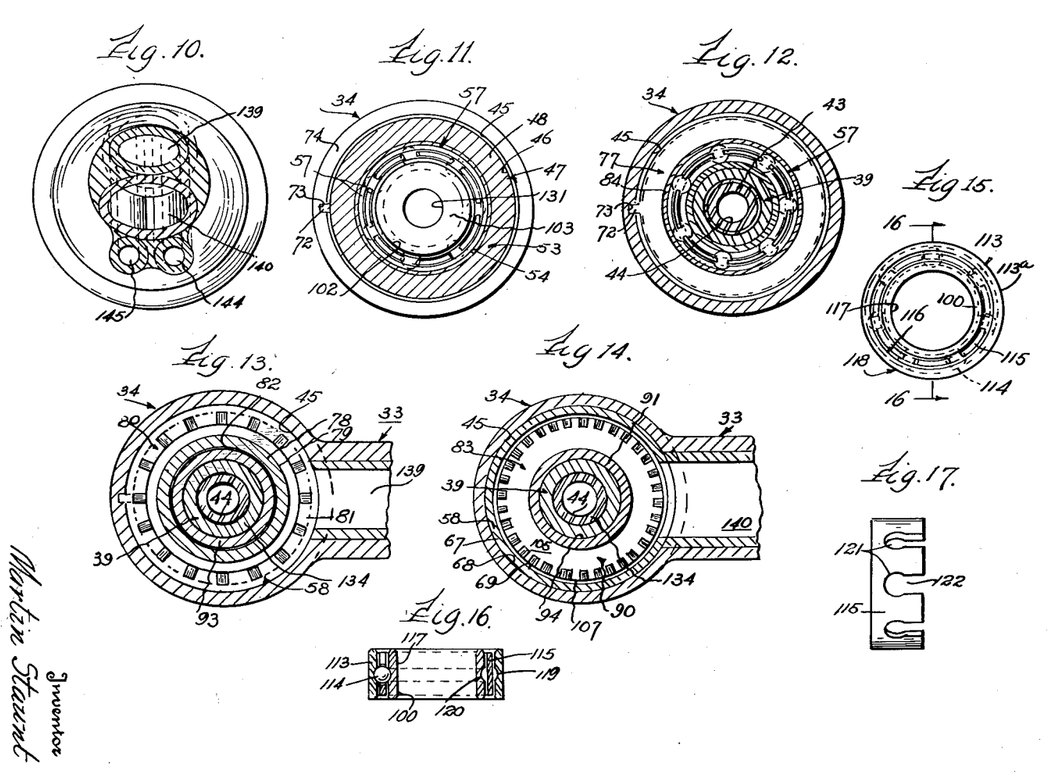
FIG. 10 is a fragmentary sectional view, taken on the plane of the line 10—10 of FIG. 6, looking in the direction of the arrows.
FIG. 11 is a sectional view, taken on the plane of the line 11—11 of FIG. 6, looking in the direction of the arrows, with the top cap removed.
FIG. 12 is a sectional view taken on the plane of the line 12—12 of FIG. 6, looking in the direction of the arrows.
FIG. 13 is a fragmentary sectional view, taken on the plane of the line 13—13 of FIG. 6, showing the stator slots in plan.
FIG. 14 is a fragmentary sectional view, taken on the plane of the line 14—14 of FIG. 6, showing the upper ends of the rotor slots.
FIG. 15 is an end elevational view of one of the ball bearing assemblies.
FIG. 16 is a sectional view, taken on the plane of the line 16—16 of FIG. 15, looking in the direction of the arrows.
FIG. 17 is a side elevational view of one of the nylon ball retainers.

The balls being held in the assembly by engagement with the grooves, and the balls being spaced by the retainer, the balls hold the retainer in the position of FIG. 16, where it floats.

The clearance between the outside of the retainer and the outer race is less than the clearance between the inside of the retainer and the inner race for the purpose of making sure that there is no drag between the retainer and the inner race, which rotates rapidly.

For example, the clearance between the inner race and the inside of the ball retainer may be 0.006" and the clearance on the outside of the ball retainer with respect to the outer race may be 0.0035".

When the rotor rotates, the inner race 100 necessarily rotates with it; and the balls roll in the groove 120; but they rotate in the opposite rotative direction. It is believed that the balls are thrown out by centrifugal force, engaging in the groove 119 of the outer race, where they may have less slippage than they have with respect to the inner race.

The nylon retainer floats between the races, engaging neither of them; but it rotates and moves with the balls.

It is believed that the air, entraining a mist of lubricant, which is forced through the bearings, serves to keep the ball retainers concentrically located; and lubricant is deposited on the retainer and races and the balls, which are constantly lubricated thereby.

The structure of the lower bearing assembly 61 is the same; and the inner race is indicated at 96, the outer race 123, and the balls 124.

The air driving the turbine, containing lubricant mist, leaks along the clearances between the rotor 83 and the stator 78 to the upper bearing assembly 57, and may escape through the hole 50. When the air reaches the aperture 50, the amount of lubricant passing has already been reduced to a minimum, being deposited as drops in the bearings.

The lower bearing assembly 61 is exposed to air from the expansion space 109, carrying lubricant mist; and this air is passed through the bearings to the annular slot between the outer frusto-conical surface 64 and the inner frusto-conical surface 63, lubricating the bearing 61 during its passage.

I have found that it is desirable to increase the amount of air escaping from the annular clearance 40 about the bur shaft head 65, as follows. The bore 60, forming a socket for the outer race 123, has its wall provided with a channel, which may be ¹/₃₂" wide, extending down the cylindrical inner wall 60 at 125. This channel communicates with groove 126 located in the base of bore 60 in the annular shoulder 62, and provides additional leakage of drive air past the ball bearing 61 to the conical nozzle 40.

This increases the air issuing from the nozzle clearance 40 in a conical air stream about the bur shaft 112 and converging on the bur 111 to increase the cooling effect.

The bur shaft 39 comprises a stainless steel tube having a cylindrical bore 127 and a plane end 128, and terminating in the threaded counterbore 101 at the top.

The bur shaft has an annular shoulder at 129 and a slightly larger counterbore 130 extending upward from said shoulder, where the bore is enlarged by several thousandths to form the annular shoulder 129.

The bur shaft has a pair of parallel flats 65a on its enlarged head for grip by a wrench.

The hollow threaded plug 102 of stainless steel has a through aperture 131, which terminates in a sharp edge 132 and a beveled end surface engaging the end of the plastic tube 134, which is preferably made of Teflon. The plastic tube 134 has an inner cylindrical bore 135 and an outer cylindrical surface 136, the outer diameter of which is initially uniform throughout its length, except that a short portion at the lower end is a few thousandths greater outer diameter.

The purpose of making the lower end slightly larger is to compress the plastic sleeve into the bur tube 39 at its lower end, while a mandrel is inserted in the bore 135, so that the Teflon is under greater compression at that point, where there is a maximum lateral pressure exerted on the bur shank.

At its upper end the plastic tube 134 is also initially of the same uniform outer diameter throughout, but as the plastic tube 134 is forced into the bore of the shaft with a mandrel having an annular shoulder engaging the end 137, the upper end engages the beveled end 131a of the plug 102; and the Teflon is forced outward and expanded into the counterbore 130 anchored against the annular shoulder 129 for retaining the plastic tube in the bur shaft.

The plastic tube is adapted to grip the cylindrical portions of shanks of burs and other tools, even though they have flats or slots or other formations beneath their cylindrical surfaces for locking the shank in, in other types of handpieces.

The inlet port for the air turbine unit comprises a rectangular aperture 138 in the curved cylindrical wall of the shell 67, as shown in FIG. 2; and the outlet port for the turbine is indicated at 110 (FIG. 6) in shell 67.

The head housing 34 is integrally brazed to a substantially cylindrical neck tube 33, which is formed by brazing together two tubes, one small and the other larger, indicated at 139 and 140, these tubes being initially round, but deformed into substantially D cross section at their left end in FIG. 6, where the flat sides are brazed together at 141.

The ends of these D shaped tubes at the left are curved to fit against the cylindrical side wall of the shell 67 at the inlet 138 and the outlet 110; and the lower tube 140 is flared downward at 142 to meet an aperture 143 below the conical end 70 of the shell.

The two D tubes, when brazed together, form a finished cylindrical neck 33, except that they have also secured to the lower side of the tube 140 a pair of water and air tubes 196 and 197. These two tiny tubes extend along below the neck 33; and each is curved downwardly and brazed to the rounded portion 36 of the head housing 34 at 146.

The two tiny tubes 196, 197 for water and air terminate in beveled ends flush with the end 37 of the head housing, as shown in FIG. 1, forming water and air nozzles 144, 145, pointing toward the cutting bur 111.

The air issuing from the annular nozzle sucks in the water issuing from the water nozzle 144, passing so that the water is caused to rotate and is atomized into a blunt conical point at the bur 111, cooling the bur and the cavity by the application of cool water and air.

The control of the supply of air to the turbine is such that both driving air and water are turned on simultaneously and off simultaneously so that the grinding end of the bur and the tooth are always cooled when a bur is running.

When the water and air-lubricant supply are turned off, without removing the handpiece head from the mouth or changing the direction of his gaze or the position of patient or dentist, the operator may turn on the air supply, causing air to issue from nozzle 145 of the air tube 197, which is supplied with filtered, dried, and heated air from a source further to be described, for blowing out the chips and grindings and drying the cavity, after which the grinding may be continued.

This continuous facility for grinding, inspection, and blowing away chips saves a great deal of time, as the patient is apt to change his position or close his mouth when the dentist removes a handpiece according to the prior art and reaches for a hot air syringe to blow out the chips and dry the cavity.

The alternate grinding and cavity cleaning with the present handpiece actually takes less time than was spent for cutting the cavity in the devices of the prior art.

Referring to FIG. 6, the composite assembly of the two D tubes 139, 140 and the two tiny water and air tubes 144, 145, all brazed together, extend into a knee joint 32, comprising a tapered tubular member having an obtuse angular bend, and is provided with the angularly extending short end portion 151, having a reduced threaded end 152 and an annular shoulder 153.

At the point of entry of the neck 33 into the elbow 32 the juncture is provided with a fillet 153a and smoothed and rounded; and the elbow is provided with grooves 154 and knurled lands 155 at both for its ends for convenient grip by the operator.

Figure 18:
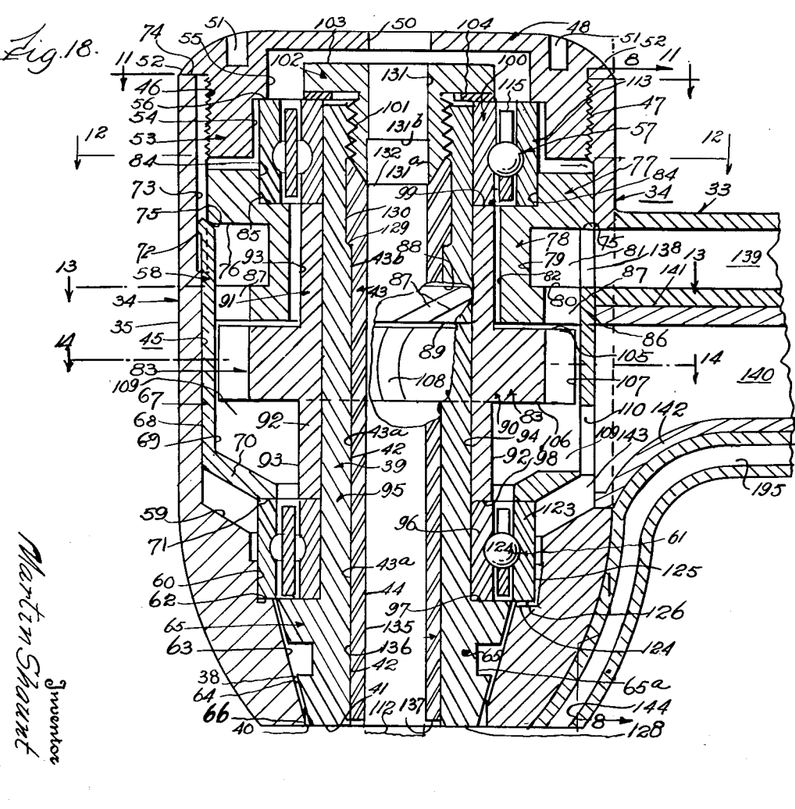
FIG. 18 is an enlarged fragmentary sectional view taken on the same plane as FIG. 6, with the parts of the turbine in section.
Figure 19:
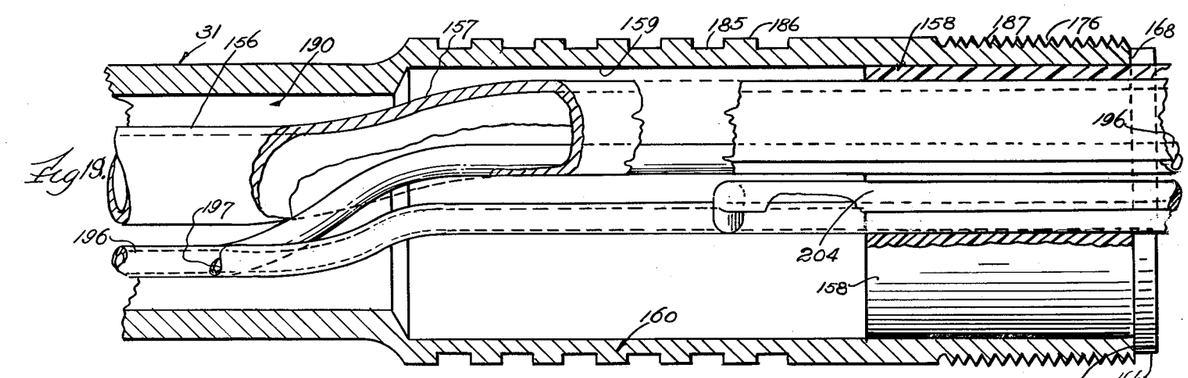
FIG. 19 is an enlarged sectional view, taken on a plane extending diametrically through the handpiece handle, showing a continuation of the right end of the structure of FIG. 7.
Figure 19A:
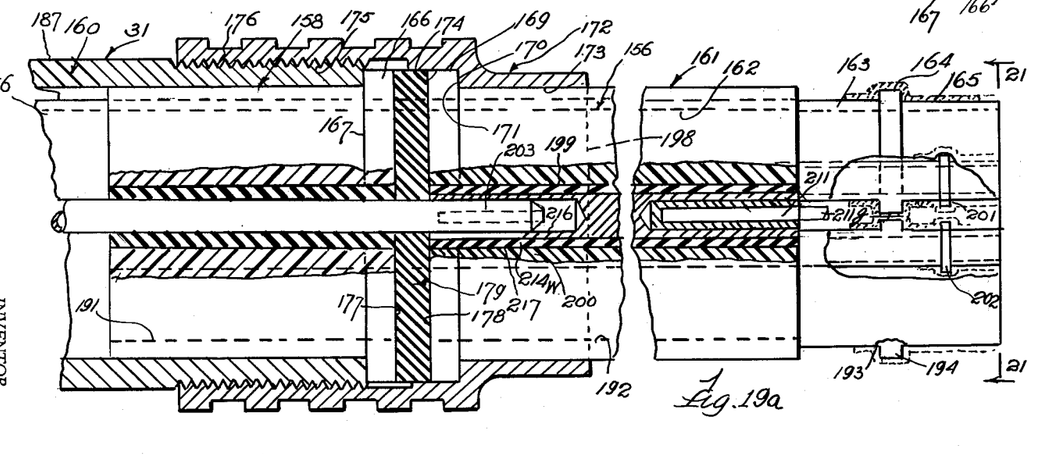
FIG. 19a is a fragmentary sectional view on the same plane, showing a continuation of the handpiece structure from the right end of FIG. 19.
Figure 20:
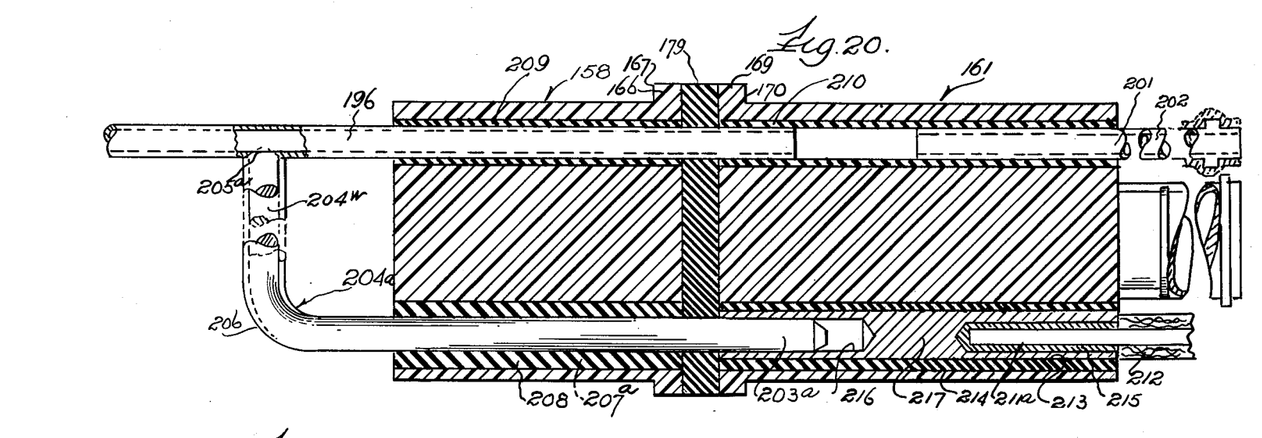
FIG. 20 is a fragmentary elevational view in partial section, taken on the plane of the line 20—20 of FIG. 21, looking in the direction of the arrows.

The upper D tube 139 extends into the elbow and is spread into a cylindrical tube 156 just before it emerges from the elbow, and extends up into the handle 31 (FIG. 7) through which it continues, as shown in FIG. 18, with an offset. This tube 139 and its extensions 156, 157 constitutes the air-lubricant mist supply for driving and lubricating the turbine and for cooling its bearings and aiding in the cooling of the rotating bur.

The tube extends to a cylindrical brass plug 158, which is slidably mounted in a cylindrical bore 159 in the enlarged end portion 160 of the handle 31, where the tube projects into a similar brass cylindrical plug 161, having a bore 162 for receiving the end of the tube 156 with a tight fit, and communicating with a longitudinally projecting ferrule 163, having a rib 164 for retaining a plastic hose 165.

The plug 158 has a radially projecting flange 166, presenting an annular shoulder 167 engaging the end 168 of the handle tube 31; and the plug 161 has a radially extending flange 169, having an annular shoulder 170 engaged by annular shoulder 171 in a gland fitting 172.

The gland fitting has a cylindrical bore 173 sliding on the plug 161 and an enlarged bore 174 receiving the flange 169 and a threaded counterbore 175 threaded on the threaded portion 176 on the end of the handle tube 31.

The two plugs present registering apertures to each other for pressure air and lubricant mist, exhaust air, water, and dry air, and are provided with the opposed flat surfaces 177, 178, between which a resilient washer 179 of duprene or neoprene may be compressed, and provided with registering apertures for passing the tubes and providing communication between the registering conduits.

A handle tube 31 comprises a substantially cylindrical stainless steel tube having internal threads 180 (FIG. 7) at its lower end, where the annular end 181 engages the threads 152 and annular shoulder 153 on the knee joint 32.

The handle 31 may have a smooth cylindrical portion 182 between the end portions, which have grooves 183 and knurled lands 184 at the lower end, and an enlarged portion with grooves 185 and knurled lands 186 at the upper end, terminating in the smooth cylindrical upper end 187 threaded at 176.

The knurled lands and grooves are for the purpose of providing a non-slipping grip in the hand of the operator.

The larger D tube 140 (FIG. 6) extends into the elbow 32; and thereafter exhaust air from the turbine issues from its end 188 into the bore 189 of the elbow, which provides an enlarged path for the expanded exhaust air leading to the bore 190 in the handle 31.

This exhaust air bore terminates at the plug 158, which has a through bore 191 for passing exhaust air and communicating through a hole in the gasket 179 with a through bore 192 in the plug 161, leading to a ribbed tube 193, having ribs 194 for retaining the plastic hose carrying exhaust air away from the handpiece.

The water tube 196 extends into the elbow 32 beside the air tube 197, all of these being brazed together; and both these small tubes 196, 197 are bent obtusely at 195 in the elbow; and each has an integral extension, comprising a separate stainless steel tube 196, 197, extending through the handle and through complementary apertures in the plug 158.

The air supply tube 156 for the supply of air and lubricant mist and the two tiny dry air and water tubes 196, 197 project axially from the plug 191 to be inserted into the plug 161 through the gasket 179; and for convenience in handling these three tubes at the gland 172 the projections of the tube are of unequal length.

Thus the tube 156 may end at 198; and the tubes 196, 197 may be successively shorter, ending at 199 and 200. Having the tubes of different lengths, projecting from the plug 158, permits the operator to insert one tube after the other in the apertures in the plug 161.

The plug 158 passes the exhaust air through conduits 191 and 192 to the ferrule 193, supporting a plastic hose. The plug 161 also supports a pair of tiny tubes 201, 202, which carry plastic tubes of equivalent size; and all the plastic tubes issuing from the plug 161 are preferably cemented together.

The air tube 197, being made of an alloy of nickel and chromium, it is also adapted to be used as an electrical resistance for heating the air which passes through it.

The lower end of air tube 197 is grounded on the handpiece housing, while the upper end is preferably provided with an electrical connector, comprising a prong 203, which is insulated with respect to the plugs 158 and 161. For this purpose an extra length 204a of solid brass or copper wire 204 is brazed to the tube 197 at 205a, and is provided with a right angle turn 206 so that it may have a longitudinally extending portion 207a, the extension of which forms the prong 203a.

Sleeves of insulation at 208 surround the wire 204a, and at 209 surround the tube 197, extending through the plug 158. The plug 161 may also have an insulating sleeve at 210 in the plug 161 surrounding the tube 197; and the plug 161 may be insulated from all of the tubes passing into it. A similar wire 204w is connected to the water tube 196 and provided with a prong 203w and electrical connector sleeve 214w to provide electrical current for heating the water going to the water tube 196.

In addition to the three plastic hoses extending from the plug 161, there may be an electrical conductor 211a covered with plastic insulation 212 cemented to the adjacent hoses; and the insulation 212 may extend into a bore 213 in an electrical connector sleeve 217 to which the conductor 211 is connected by being soldered into a bore 215. A separate ground wire conductor 211g is soldered in an aperture in plug 161.

The electrical connector sleeve 217 extends through the plug 161 and has a connector bore 216 at its other end, receiving the prong 203a and effecting the electrical connection. An insulating sleeve 214 surrounds the connector sleeve 217. Thus the flexible connections to the handpiece not only include the air supply and air return for the turbine, but the separate air and water hoses have an electrical connector for conducting electricity to the air and water tube to heat them.

The current supplied to the heaters 196 and 197 is preferably of low voltage, being reduced to a low voltage in a voltage transformer, the primary of which is connected to a 110 volt A.C. line.

Figure 21:
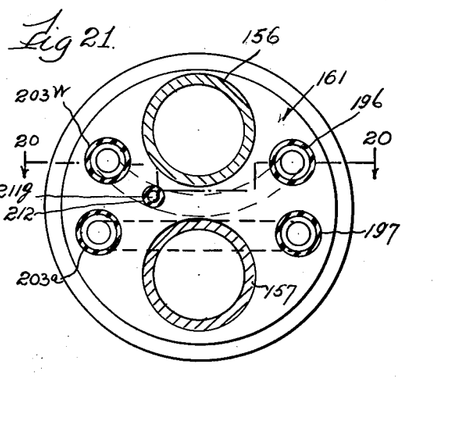
FIG. 21 is a sectional view taken on the plane of the line 21—21 of FIG. 19a, looking in the direction of the arrows.

Referring to FIG. 21, this view shows the plug 158, with drive air tube 156, exhaust air tube 157, common ground wire 211g, air tube 197, water tube 196, air heater pin jack 203a, and water heater pin jack 203w.

In order to prevent over-heating the A.C. line may include a thermostatic snap disc interrupter, which alternately allows the line on and off, and has been found to supply sufficient current periodically to heat the air issuing from the ship blower sufficiently to dry the air and to prevent trauma to the patient, which might be caused by the use of cool air.

Figure 22:
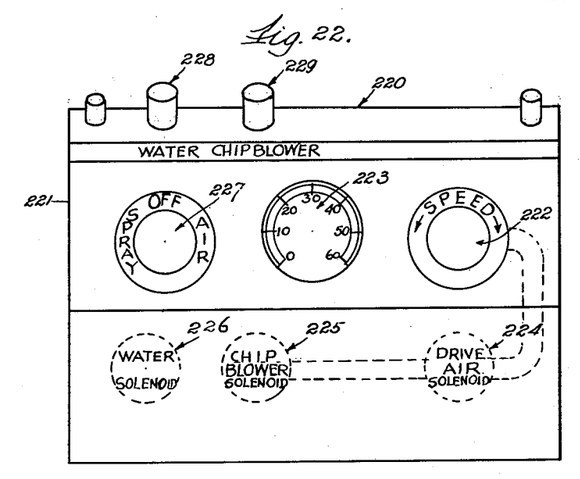
FIG. 22 is a front elevational view of the control unit for the handpiece.

The warm air is also adapted to dry the cavity. A temperature of about 120 degrees F. is provided by such an arrangement for the warm air. The air under pressure for blowing chips, the water under pressure for cooling the grinding bur, and the combined air under pressure and lubricant mist are controlled by a control unit 220 (FIG. 22).

The control unit 220 is enclosed in a housing 221, the face of which is provided with a rotating knob 222 controlling the air valve located in the conduit extending from the source of air under pressure to the control unit.

The air valve, controlled by knob 222, controls the volume and pressure of air supplied to the handpiece. The rotative speed of the turbine increases with increased air pressure; and therefore the speed of operation may be increased by turning the knob 222 in one direction or reduced by turning the knob in the opposite direction.

The housing 221 supports the dial of an air gauge 223, which indicates the pressure of the air applied to the handpiece turbine; and the knob 222 may be set so that the pressure at which the turbine is operated is that recommended by the instruction manual, such as, for example, 20 pounds.

The conduit leading from the source of air supply includes a solenoid valve, indicated in dotted lines at 224 in FIG. 22, and having the legend "Drive Air Solenoid." 225 indicates another solenoid actuated valve in the air supply conduit leading to the chip blower tube 145 (FIG. 3) and bearing the legend "Chip Blower Solenoid."

226 indicates on the housing the dotted outline of a water solenoid valve which controls the flow of water to the water spray tube 144 from the control unit. 227 indicates the knob of a selector switch, which has movable contacts that are in circuit when the knob 227 is turned to spray; and these contacts close the circuit of the water solenoid 226 and the drive air solenoid 224, opening the water valve and the drive air valve, when the foot switch is closed.

Thus when the knob is turned to the left to the point "Spray," the handpiece is supplied with driving air and cooling water; and part of the driving air issues from the annular nozzle 40 and is directed in a conical stream toward the bur with the water which it sucks into the stream and atomizes.

The selector switch 227 may be turned to "Off" position, as indicated in FIG. 22, turning off all the circuits.

The third position of the selector switch 227 is indicated at the right by the legend "Air"; and when the knob 227 is turned to air position, the drive air solenoid is energized, opening its air valve; but the water solenoid is cut off so that air alone blows on the bur while the handpiece is running with the selector switch in the air position. Whenever the electric current is turned on through the chip blower solenoid, which is connected by conductor 211a to the air heating tube 197, heated air is adapted to be supplied to the air nozzle 145 for blowing away the chips between the grinding operations.

The selector switch 227 is in circuit with a rocker foot switch, which effects the connections for drive and water spray in one position, when a dentist depresses the outer end of the rocker switch, but also cuts off the spray and drive when the rocker switch is in level position, and turns on the air of the chip blower and heats the air when the rocker switch is depressed at its cord end.

The knob 228 controls a needle valve in the water conduit, leading to water tube 144, for adjusting the water spray intensity and volume; and the knob 229 controls a needle valve in the conduit leading to the air tube 145, for adjusting the air volume and pressure of warm air issuing from the chip blower conduit 145.

Figure 23:
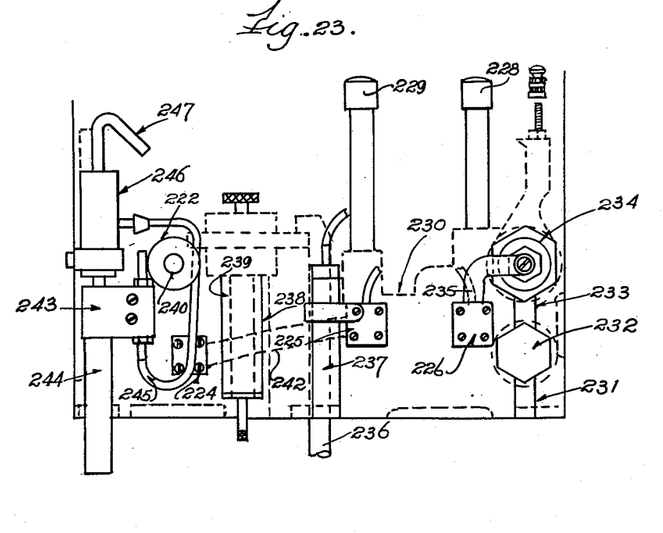
FIG. 23 is a diagrammatic rear elevational view of the control unit, which provides the air and water supply for operating the handpiece.

Referring to FIG. 23, this is a rear elevational view of the control unit casting in dotted lines and its associated parts. The close tolerances and small size of the parts of the air driven handpiece are such that moisture must be excluded from the driving air, which drives the turbine; and particles of dust and dirt must also be excluded or filtered from the air to prevent such water and dirt from gaining access to the interior of the turbine and the ball bearings.

The casting for the control unit is indicated in its entirety at 230; and it preferably comprises an aluminum casting of substantially rectangular shape in elevation, which provides a mounting for the solenoid valves, the selector switch, the gauge, the needle valves that control air and water flow, and the control valve for controlling the pressure and volume of the driving air.

The casting is cored to provide suitable conduits with inlets and outlets for the various controlling members; and in FIG. 23, 231 indicates the inlet for water under pressure. The water is passed through a filter 232 for removing dirt and particles that might obstruct conduits, and thereafter goes through cored conduit 233 to a pressure regulator valve 234, which is adjusted to provide the proper water pressure, since the pressure available in city water lines varies considerably.

From the pressure regulator 234 a cored conduit 235 extends to solenoid valve 226, from which solenoid valve a drilled passage extends to a needle valve controlled by knob 228, from which another drilled passage extends to the small water hose connection, which carries water to the water tube 144.

In FIG. 23 the supply of air under pressure is connected at the point 236, having first passed through a water separator, which removes any water of condensation from the line. A cored conduit 237 passes upward in the casting to conduct the air to the interior of an air filter 238 (FIG. 23).

The air is filtered to remove particles of dust, which would interfere with the operation of the turbine, and passes into the interior of the filter member 239 and out the top to the air pressure regulator valve which controls the volume and pressure of the driving air by means of the knob 222, which is located with its valve at 240.

Referring, for clarity, back to FIG. 22, the air which is reduced in pressure passes down a cored conduit 241 to the drive air solenoid 224, which controls a valve turning the drive air on and off. Another cored conduit 242 carries the filtered air laterally to the chip blower solenoid valve 225, which controls the flow of heated air out of the air tube 145.

The air from the conduit controlled by the drive air solenoid 224 goes to a lubricant atomizer, indicated in its entirety by the numeral 243 in FIG. 23. This lubricant atomizer has a replaceable transparent reservoir 244 containing liquid lubricant, which is forced into the unit 243 by air pressure, and which is sprayed and atomized with the air, which entrains the lubricant as a mist, passing out of the conduit 245 (FIG. 23) into a separator chamber 246 at the top of the atomizer.

In the separator chamber 246 the drops of oil are separated from the air, falling to the bottom of the separator chamber 246, while the air and lubricant mist passes out of the conduit 247. The conduit 247 is connected to the drive air hose, which leads to the drive air inlet tube 139, carrying air under pressure and lubricant mist into the inlet of the turbine.

The lubricant atomizer 243 may be constructed substantially as shown in my prior application, Case 29, Lubricating Apparatus, Ser. No. 757,062, filed August 25, 1958, the disclosure of which is hereby incorporated herein my reference thereto.

*Wiring Diagram*

Figure 24:
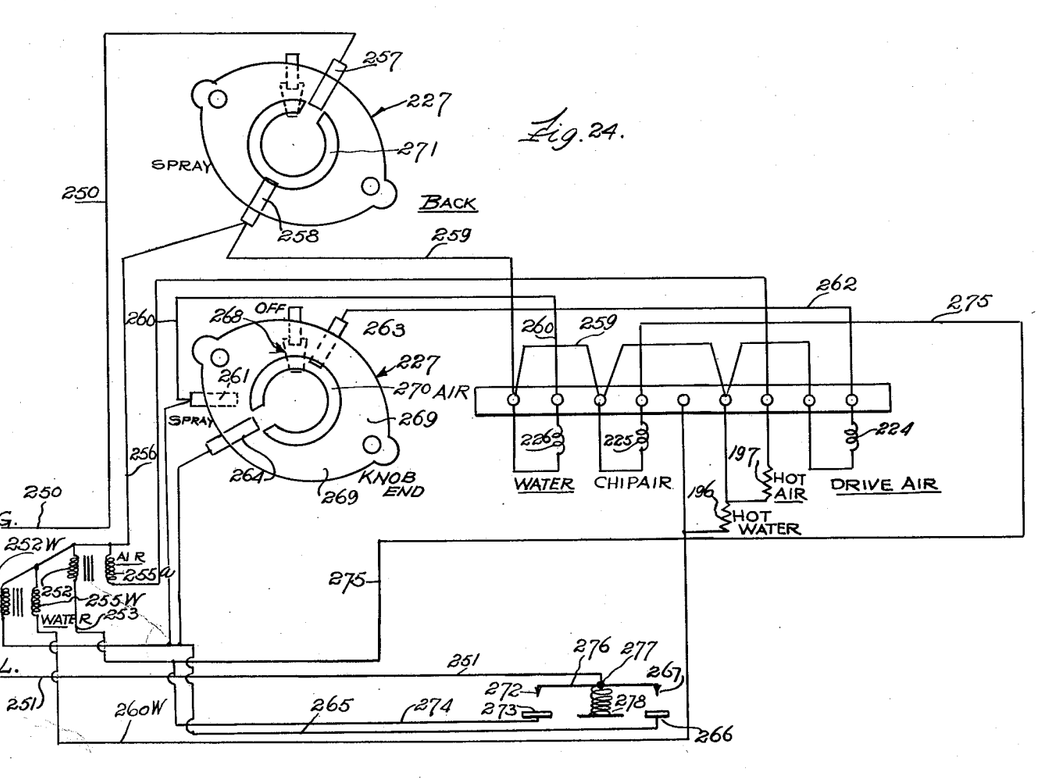
FIG. 24 is a wiring diagram of the circuits for the control unit and handpiece.

FIG. 24 indicates a wiring diagram for the control of the air driven handpiece and its adjuncts. In the diagram 250 and 251 indicate the electric supply, which may be 115 or 250 volt 60 cycle A.C. or 110 v. D.C. Conductor 250 is connected to the terminal 257 of switch segment 227. Terminal 258 is connected to the terminal of a transformer 252 via line 256, the other terminal of which is connected by conductor 253 to the fixed chip blower control 273 on the foot rocker switch 255.

The other line conductor 251 is connected to the rocker arm of the switch 255, which rocker arm is normally held in the level disconnect position. 255a indicates the step-down secondary of the transformer having one terminal connected to line 256.

The line 250 is connected to contact 257 of an "On, Off" switch, which is shown in the "Off" position. The other contact 258 of this "On, Off" switch is connected by conductor 259 in parallel to a plurality of devices, comprising a water solenoid valve 226, a chip air solenoid valve 225, and air heating element 196, a water heating element 197, and a drive air solenoid valve 224.

The water solenoid is connected at its other terminal by conductor 260 to a contact 261, comprising the spray contact on the selector switch 227. The drive air solenoid 224 has its other terminal connected by conductor 262 to contact 263 on the selector contact switch 227.

The selector switch is so arranged that the circuit is closed from a drive contact 264 to both contacts, spray and air, 261, 263, simultaneously when the selector switch is turned toward spray.

The transformer secondaries 255a, 255w are, therefore, adapted to be connected via the lead 256 and through the conductor 259 to heaters 196 and 197, returning via lead 260w and 256.

Figure 25:
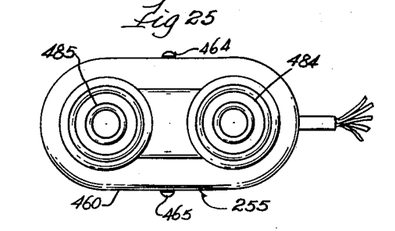
FIG. 25 is a top plan view of the foot controller switch.
Figure 26:
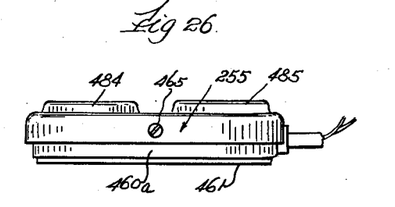
FIG. 26 is a side elevational view of the foot controller switch.
Figure 27:
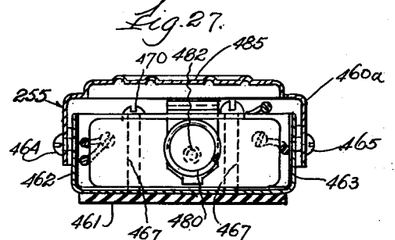
FIG. 27 is a sectional view taken through the plane of the line 27—27 of FIG. 29, looking in the direction of the arrows.
Figure 28:
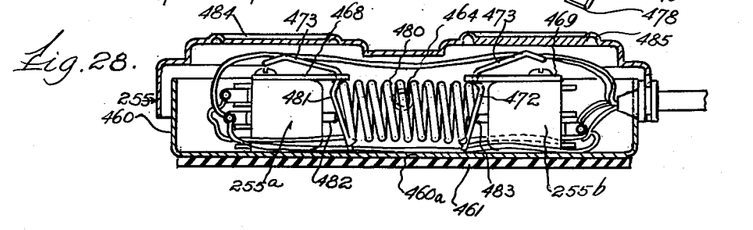
FIG. 28 is a sectional view taken on the plane of the line 28—28 of FIG. 29, looking in the direction of the arrows.
Figure 29:
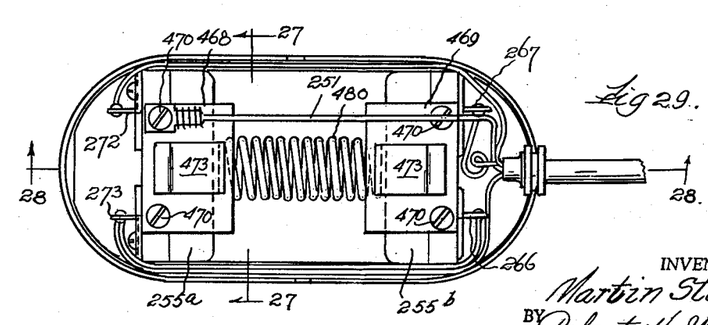
FIG. 29 is a top plan view of the foot controller switch mechanism with the top cover removed.

When the "On" and "Off" switch is opened, as shown in FIG. 25, the secondary circuit is open and no heat is produced, even though the foot control switch is operated.

The contact 264 of the selector switch is connected by conductor 265 to the drive contact 266 of the foot controller. When the operator steps on the right end of the foot controller, a movable contact 267 engages the drive contact 266 and connects it to the line 251 so that the circuit is in condition to drive the handpiece, provided the selector switch is closed, by moving it to the position labeled "Spray."

The selector switch has an additional contact 268, shown in dotted lines, because it is on the back of the supporting insulating plate 269, and contact 268 is fixedly secured to the annular contact 270 to rotate with it and engage the spray contact 261, which is shorter than the contacts 263, 264.

When the selector switch is turned to the spray position, contacts 261, 268 are closed; and this completes a circuit from the contact 267 of the foot controller through conductor 265, contact 264, contact 270, contact 268, contact 261, conductor 260, to the water solenoid 226, conductor 259, contact 258, contact 271, contact 257, back to the line 250.

Simultaneously a circuit is completed from contact 261 of switch 227 through transformer primary 252w to contact 258 of switch 227 through 271 to 257 back to the line 250. This energizes heater 196 through the transformer secondary 255w by means of line 256 to terminal 258 on switch 227 and line 259 through heater 196 through line 260w back to transformer primary 255w.

The closure of the drive contact 267 also closes the circuit from contact 264 through contact 270, contact 263, conductor 262, through the drive solenoid, opening the air drive valve; and the drive solenoid 224 is connected back to line through conductor 259, leading to the "On" and "Off" switch contacts.

Thus the closure of the front contact of the foot controller starts the air driven handpiece by supplying air under pressure; and simultaneously it supplies warmed water to spray the end of the bur.

When the selector switch is turned to the right to the air position, the spray contacts 261, 268 are opened; but contacts 264, 270, and 263 are closed. The drive solenoid 224 is then disconnected through the foot controller; but the circuits are conditioned for supplying chip air and heat. The chip air is turned on by tilting the foot controller downward at its cord or left side, causing movable contact 272 to engage fixed contact 273.

This closes a circuit from the contact 258 of switch 227 through the transformer primary 252, energizing the heater through conductor 274 to contact 273, contact 272, to the line conductor 251.

Another circuit is closed from line 251 through contact 273, conductor 274 to conductor 275, leading to chip air solenoid 225, conductor 259, through the "On" and "Off" switch back to the line at 250.

At this time the air drive and supply of water are not turned on because the tilting of the foot controller to close contacts 272 and 273 maintains the opening of the contacts at 267 and 266.

The foot controller pedal 276 is pivoted at 277 and maintained in the "Off" position by a compression spring 278, which holds it in the intermediate off position.

It will thus be observed that the electrical circuits are such that the operator may have heated water and air drive at the handpiece by pressing the front side of the foot controller downward, when the selector switch is in spray position, or he may have air drive and air only when the selector switch is in "Air" position, by depressing the right end of the rocker arm; and he may stop both the water and drive by lifting his foot. He may also have heated chip air by pressing the cord or left end of the foot controller downward in FIG. 24.

This permits the operator to cut while provided with automatic water cooling and to stop the cutting without removing the handpiece and blow out the cavity with warm air. This saves the dentist a great deal of time, as he can alternately cut and blow out the cavity; and he does not have to remove the handpiece and reach for a hot air syringe.

*Foot Controller Switch*

The foot controller switch, by means of which the user controls the circuits for driving the handpiece, is shown in FIGS. 25–29, inclusive. This foot controller switch may be of the rocker type; and its rocker arm is indicated at 255, for controlling the contacts of a pair of microswitches 255a and 255b.

These microswitches include terminals indicated at 272 and 273, for controlling the drive air and the terminals 266 and 267 for controlling the chip blower air. A lead 251 extends to both the terminals 272, 267, which are common on the mechanism for alternately energizing one or the other of the microswitches 255a or 255b. A ground lead is connected to the housing through screw 470 for circuit protection against short circuit.

The rocker switch preferably includes an oval sheet metal housing 460a, the bottom of which is provided with a soft rubber pad 461 adhesively attached to prevent slippage. The housing 460 has upwardly extending side walls 462, 463 provided with threaded apertures for receiving the two screw bolts 464, 465, which provide a pivotal mounting for the rocker arm 255.

The rocker arm comprises an oval housing member similar in shape to the housing 460, but sufficiently larger so that it may be pivotally mounted on the housing 460a by having its side walls overlap the sides 462, 463 of the housing 460.

Screw bolts 464, 465 pass through apertures in the side walls 466 of the rocker arm 255 and are threaded into the side walls 462, 463.

Each microswitch 255a and 255b has a pair of through bores 467 receiving screw bolts which pass through a metal base plate 468, 469; and the screw bolts 470 in each case are threaded into the bottom wall of the housing 460a, securing the microswitches therein.

Figure 30:
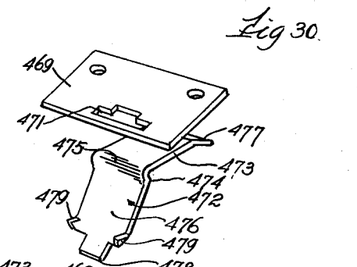
FIG. 30 is an exploded view in perspective of the pivot plate and pivot lever of the type used in FIG. 28 in the foot controller switch.

Each plate 468, 469 may be substantially as shown in FIG. 30, where the plates are provided with rectangular slots 471 for passing the switch actuating member 472 that is installed before the plates are attached.

Each switch actuating member has a horizontal flange 473, a pivot flange 474 extending downward at an easy bend 475, and a spring mounting flange 476. The horizontal flange is turned downward at 477 to provide a stop flange engaging the top of each plate. At its lower end each flange 476 has a downwardly extending tongue 478 and two upwardly turned lugs 479.

The lugs 479 engage outside the ends of a compression spring 480, which is also confined by engaging below one of the plates 468, 469. Thus each end of the spring is confined on three sides; and the spring 480 urges both of the switch actuating members 472 and 481 to the position shown in FIG. 28, where the two buttons 482, 483 of the microswitches are depressed.

The microswitches 255a, 255b are of the type having closed contacts when the switch buttons 482, 483 are released to spring outward; and the microswitch contacts are opened when the buttons 482, 483 are pressed inward by the spring 480, which urges the arms 472, 481 apart so that the flanges 473 project upward into engagement with the inside of the rocker arm 255, which they hold in an intermediate horizontal open switch position.

The rocker arm 255 is formed with a pair of cup shaped pedal formations 484 and 485; and the foot controller has all of its contacts normally open. The contacts corresponding to the drive air connected to terminals 272 and 273 are closed by pressing downward on the foot pedal 485 and opened by releasing the pressure.

The contacts controlled by terminals 266 and 267 are closed by pressing downward on the other pedal formation 484 of the rocker arm 255 for controlling the chip blower air, which is turned on by pressing the foot pedal 484 and turned off by releasing it.

Referring to FIG. 21, the hose and conductor assembly, extending from the handpiece 30 to the control unit 220, consists of conduits and electrically insulated conductor cemented together and including conduits leading to the drive air tube 156, the exhaust air tube 157, the water tube 196, the chip air tube 197, and insulated electrical conductors connected to the water heater connector 203w, to the air heater connector 203a, and to the common ground 211g.

This conduit and electrical conductor assembly extends to the control unit 220 (FIG. 22), which is provided with air and water, as indicated in FIG. 23, and electrical connectors, as indicated in FIG. 24.

*Operation*

The operation of the parts of the handpiece has been described in connection with the features of their construction; but the advantages and over-all operation may be summarized as follows:

The present handpiece may be operated at speeds up to 250,000 r.p.m. with 30 pounds per square inch pressure, the shaft running free; but it is preferably not operated at pressures over 20 pounds per square inch, and as the speed varies with the air pressure, the speed may be varied by adjusting the air pressure from zero to 20 pounds. At 20 pounds per square inch the speed may vary from 160,000 r.p.m. to 180,000 r.p.m.; at at these speeds tungsten carbide and diamond burs should be employed.

The present handpiece has a greatly increased torque over the air driven handpieces of the prior art and may be operated without stalling, such as occurs with the devices of the prior art, due to their lack of sufficient torque.

Due to the high speed at which the handpiece operates, it is necessary to cool both the bur and the tooth; and cooling is assured with the present handpiece by having the water supply nozzle on the handpiece turned on simultaneously with the drive air and by having a part of the drive air issue from a conical nozzle surrounding the shaft and converging the cooling air with atomized water on the bur and into the cavity on all sides.

When the drive air is turned off, the cooling water and air are also turned off; and without removing the handpiece, the dentist may direct chip air into the cavity for blowing out chips and drying the cavity.

This may be done by merely moving the foot controller switch to the chip air position.

While the air has been referred to as cooling air and the water as cooling water, they may actually be heated to a comfortable temperature by the heaters in the handpiece; and the dry air may also be heated in the handpiece by pre-heating the air in the control unit.

A very important feature of the invention is the drive of the turbine with air under pressure containing lubricant mist, which passes out of the handpiece head through the ball bearings at the top and the bottom of the shaft, depositing lubricant on the races, balls, and ball retainers, and constantly supplying lubricant whenever the handpiece is operated, so that adequate lubrication is assured.

The present handpiece will operate more quietly and with less vibration than the devices of the prior art; and this becomes very important as the speed of operation is increased, which tends to increase the vibration and noise level.

The exhaust air is carried away from the handpiece and away from the immediate vicinity of the patient and dentist to the control unit, where any remaining oil mist is filtered out and deposited.

The present handpiece has a more uniform torque distributed uniformly about the periphery of the rotor, due to the application of air to all sides of the rotor; and the dental bur or cutter will produce less chatter and make the cut surface more smooth and true than in the devices of the prior art.

The construction of the ball bearings described is a very important feature of the handpiece; and the simple structure of the plastic bur tube acting as a chuck is another important feature, all contributing to the smooth operation, high speed, reduction of sound, and reduction of vibration of the assembly.

The plastic ball retainer permits proper radial and axial movement of the parts; and the end play in the ball bearings may permit an end play movement of the bur of one thousandth of an inch.

The path of the air through the stator and rotor of the turbine is short and involves a minimum number of turns, thereby reducing turbulence in the air stream as it passes through the turbine, which results in a reduction in noise over the devices of the prior art.

While I have illustrated a preferred embodiment of my invention, many modifications may be made without departing from the spirits of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A ball bearing dental handpiece assembly of the contra angle type, comprising a tubular metal handle having a transversely extending round head housing at one end, said head housing having an axial opening at one end surrounded by an annular end wall member, a hollow tubular shaft rotatably mounted in said head housing and having an open end exposed at said axial opening, a pair of anti-friction bearings supporting said shaft at its ends, each bearing comprising an inner race, an outer race, and a plurality of balls in said races, a thin cylindrical shell engaging between said outer races and fitting in said head housing, said shell having a lateral aperture between said bearings communicating with the interior of said handle, means for driving said shaft between said bearings, the end of one of said outer races engaging said annular wall member, and the other end of said latter race being engaged by the said shell, the other end of said shell engaging the inner end of the other outer race, said housing having its other end provided with a circular opening and internal threads, and a threaded member threaded in said latter open end, and having an annular shoulder engaging the outer end of said other outer race to secure the outer races in the housing, said tubular shaft carrying a pair of annular shoulders engaging and locating the inner races of said bearings, and said hollow shaft having a nozzle clearance about its exposed end for passage of air, excluding the entrance of grit, said housing also having an inlet for air and lubricant mist directed through the ball bearings, and having vents outside of each of said anti-friction bearings to pass the air, the lubricant being deposited on the bearings and races to lubricate them continuously, the said driving means comprising an air driven rotor and the handle containing a drive air tube, an exhaust air tube, a cooling water tube, and a cooling air tube, all of said tubes projecting from a metal end plug in the handle at the end opposite the head, and being provided with a resilient gasket surrounding all of said tubes at said plug, and a threaded sleeve engaging threads on the handle and surrounding a second complementary metal plug having apertures for all of said tubes, and having a face for engaging said gasket, and an annular flange engaged by said sleeve, which draws said second plug into leak-tight engagement with the handle.

2. A ball bearing dental handpiece assembly according to claim 1, in which the air and water tubes are made of electrical heater metal and the hose includes electrical conductors connecting said heater tubes in circuit to warm the cooling air and cooling water.

3. A ball bearing dental handpiece assembly of the contra angle type, comprising a tubular metal handle having a transversely extending round head housing at one end, said head housing having an axial opening at one end surrounded by an annular end wall member, a hollow tubular shaft rotatably mounted in said head housing and having an open end exposed at said axial opening, a pair of anti-friction bearings supporting said shaft at its ends, each bearing comprising an inner race, an outer race, and a plurality of balls in said races, a thin cylindrical shell engaging between said outer races and fitting in said head housing, said shell having a lateral aperture between said bearings communicating with the interior of said handle, means for driving said shaft between said bearings, the end of one of said outer races engaging said annular wall member, and the other end of said latter race being engaged by the said shell, the other end of said shell engaging the inner end of the other outer race, said housing having its other end provided with a circular opening and internal threads, and a threaded member threaded in said latter open end, and having an annular shoulder engaging the outer end of said other outer race to secure the outer races in the housing, said tubular shaft carrying a pair of annular shoulders engaging and locating the inner races of said bearings, and said hollow shaft having a nozzle clearance about its exposed end for passage of air, excluding the entrance of grit, said housing also having an inlet for air and lubricant mist directed through the ball bearings, and having vents outside of each of said anti-friction bearings to pass the air, the lubricant being deposited on the bearings and races to lubricate them continuously, the said driving means comprising an air driven rotor and the handle containing a drive air tube, an exhaust air tube, a cooling water tube, and a cooling air tube, all of said tubes projecting from a metal end plug in the handle at the end opposite the head, and being provided with a resilient gasket surrounding all of said tubes at said plug, and a threaded sleeve engaging threads on the handle and surrounding a second complementary metal plug having apertures for all of said tubes, and having a face for engaging said gasket, and an annular flange engaged by said sleeve, which draws said second plug into leak-tight engagement with the handle, said second plug having tubes connecting with each of the handle tubes and with flexible conduits in a unitary flexible hose member, the inlet for air and lubricant mist being connected to a lubricant atomizer having a lubricant reservoir, a supply of air under pressure, conduits spraying and atomozing the lubricant with the air, the air and lubricant mist passing to an oil separating chamber, where liquid oil is separated and air and lubricant mist conducted to the handpiece.

References Cited in the file of this patent

UNITED STATES PATENTS

| | | |
|---|---|---|
| 2,180,993 | Monnier | Nov. 21, 1939 |
| 2,249,058 | Staunt | July 15, 1941 |
| 2,420,338 | Page | May 13, 1947 |
| 2,442,033 | Brantly et al. | May 25, 1948 |
| 2,468,171 | Carlson | Apr. 26, 1949 |
| 2,492,966 | Ckola | Jan. 3, 1950 |
| 2,542,693 | McGlinchey | Feb. 20, 1951 |
| 2,542,833 | Page | Feb. 20, 1951 |
| 2,701,914 | Dietrich | Feb. 15, 1955 |
| 2,740,674 | Zay et al. | Apr. 3, 1956 |
| 2,799,934 | Kern | July 23, 1957 |
| 2,855,672 | Franwick et al. | Oct. 14, 1958 |
| 2,871,562 | Kern | Feb. 3, 1959 |
| 2,897,596 | Maurer | Aug. 4, 1959 |
| 2,908,976 | Flatland | Oct. 20, 1959 |
| 2,917,828 | Page | Dec. 22, 1959 |
| 2,924,880 | Ziegler et al. | Feb. 16, 1960 |

FOREIGN PATENTS

| | | |
|---|---|---|
| 91,261 | Norway | Jan. 25, 1958 |